(12) United States Patent
Coates

(10) Patent No.: US 6,668,785 B1
(45) Date of Patent: Dec. 30, 2003

(54) PISTON HEAD FOR INTERNAL COMBUSTION ENGINE

(76) Inventor: George J. Coates, Rte. 34 & Ridgewood Rd., Wall Township, NJ (US) 07719

( * ) Notice: Subject to any disclaimer, the term of this patent is extended or adjusted under 35 U.S.C. 154(b) by 0 days.

(21) Appl. No.: 10/287,419

(22) Filed: Nov. 4, 2002

(51) Int. Cl.$^7$ .................................................. F01P 1/04
(52) U.S. Cl. .................................................. 123/193.6
(58) Field of Search ............................. 123/193.6, 665, 123/666, 664

(56) References Cited

U.S. PATENT DOCUMENTS

| | | | | |
|---|---|---|---|---|
| 4,060,059 A | * | 11/1977 | Blaser | 123/193.6 |
| 4,128,092 A | * | 12/1978 | Yokota et al. | 123/193.6 |
| 4,333,426 A | * | 6/1982 | Gavasso et al. | 123/666 |
| 5,179,916 A | * | 1/1993 | Schonfeld | 123/193.6 |
| 5,653,204 A | * | 8/1997 | Shaffer | 123/193.6 |

* cited by examiner

Primary Examiner—Marguerite McMahon
(74) Attorney, Agent, or Firm—Clifford G. Frayne

(57) ABSTRACT

A piston for an internal combustion engine of the high compression type, the piston having a body member defined by a cylindrical side wall and a lower end with means for connection to a piston rod and an upper end defining the piston head, the piston head having an upstanding spherical section portion having a diameter less than the diameter of the piston, the spherical section portion being flared outwardly and upwardly to the circumferential periphery of the piston head so as to form an annular U-shaped trough about said spherical section portion and an annular crest about said annular trough, the annular crest terminating at and defining the circumferential periphery of the piston head coincidental with the cylindrical side wall of the piston.

3 Claims, 3 Drawing Sheets

PISTON HEAD FOR INTERNAL COMBUSTION ENGINE

BACKGROUND OF THE INVENTION

1. Field of the Invention

The present invention relates to internal combustion engines, and in particular to high compression internal combustion engines, such as diesel engines, and more particularly to an improved piston head for high compression internal combustion engines, such as diesel engines which protects and extends the life of the head gasket.

2. Description of the Prior Art

Internal combustion engines of the high compression variety and in particular of the diesel variety operate at compression ratios significantly greater than that of internal combustion engines of the gasoline variety. The fuel air mixture of a diesel engine ignites as a result of compression at this greater compression ratio. A diesel engine is normally of two piece construction, a lower half or block and an upper half or engine head, the two halves defining a plurality of cylinders with a piston reciprocating within the cylinders, combustion taking place proximate the upper half or engine head within the combustion chamber. Between the block and engine head there is positioned a gasket means.

In the normal operation of a diesel engine, the piston reciprocates upwardly within the cylinder during the compression stroke igniting the fuel air mixture proximate to top dead center. Normally, upon ignition, the piston's upward movement terminates prior to reaching the gasket means between the block and engine head. This exposes the gasket means to the heat of ignition and thus over time leads to deterioration of the gasket means and costly downtime and labor for replacement thereof. This operation also occurs in internal combustion engines of the spark plug ignition type, but not to the extent of diesels.

Applicant's piston head design for internal combustion engines provides for a piston head which protects the head gasket and insures that the upper circumference portion of the piston is positioned adjacent the head gasket at the time ignition takes place. This design will permit even higher compression ratios and provide a larger surface to dissipate heat.

OBJECTS OF THE INVENTION

An object of the present invention is to provide for a novel piston head for internal combustion engines, which piston head is formed with an annular outward and upward flare about its upper circumferential periphery, this annular upward flare being positioned adjacent the head gasket at the point of ignition.

Another object of the present invention is to provide for a novel piston head for an internal combustion engine which will extend the life of the head gasket of the internal combustion engine and reduce the necessity for replacement of same.

A still further object of the present invention is to provide for a novel piston head for internal combustion engines which is easily adapted to existing pistons for internal combustion engines.

A still further object of the present invention is to provide for a novel internal combustion engine which will permit higher compression ratios.

A still further object of the present invention is to provide for a novel internal combustion engine which will dissipate heat more quickly.

SUMMARY OF THE INVENTION

A piston for an internal combustion engine of the high compression type, the piston having a body member defined by a cylindrical side wall and a lower end with means for connection to a piston rod and an upper end defining the piston head, the piston head having an upstanding spherical section portion having a diameter less than the diameter of the piston, the spherical section portion being flared outwardly and upwardly to the circumferential periphery of the piston head so as to form an annular U-shaped trough about said spherical section portion and an annular crest about said annular trough, the annular crest terminating at and defining the circumferential periphery of the piston head coincidental with the cylindrical side wall of the piston.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
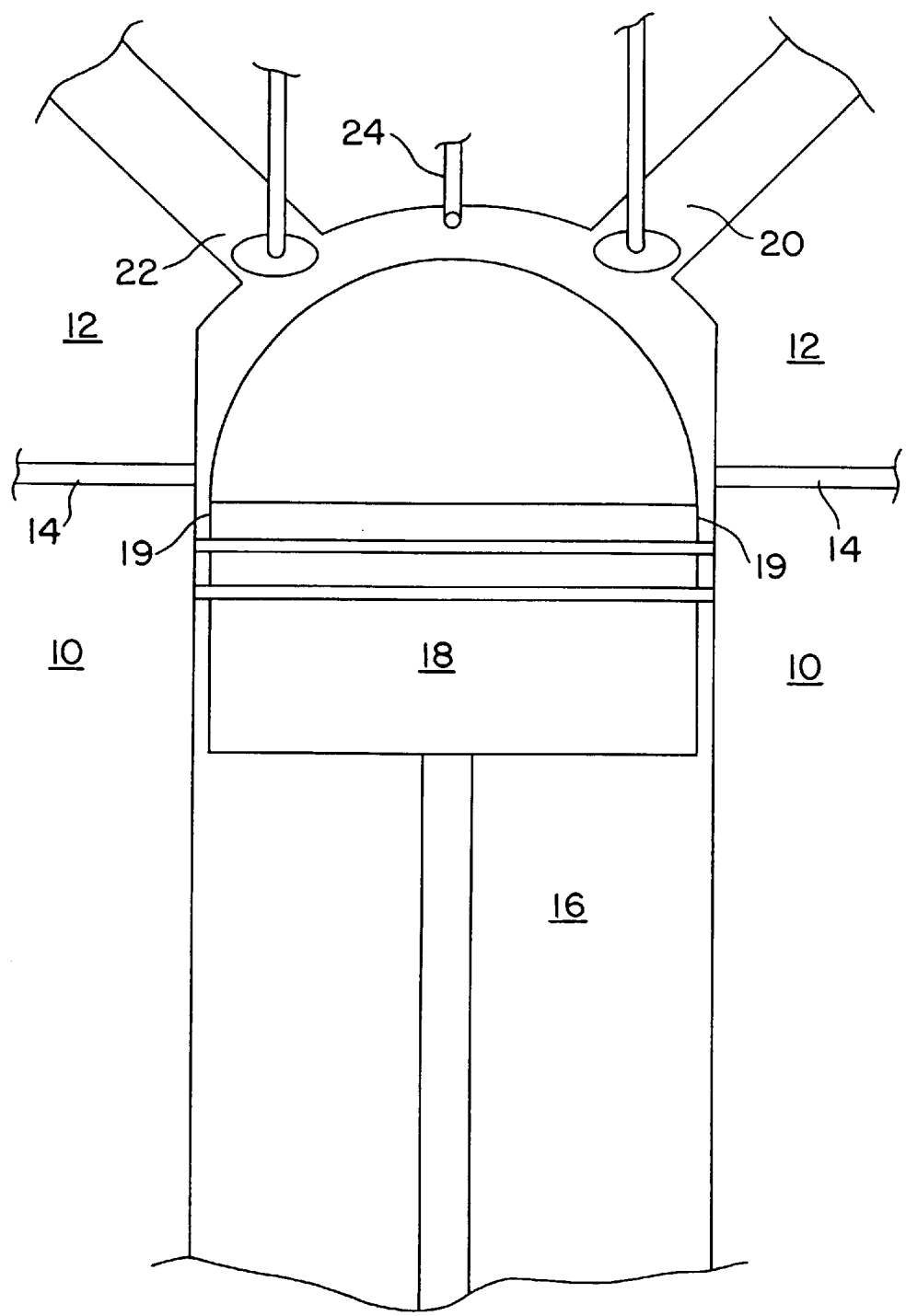
FIG. 1 is an illustration of the prior art illustrating the relationship between the two halves of the block, the head gasket, the cylinder, and piston.

FIG. 1 illustrates a typical cylinder of a diesel engine, which engine normally operates at high compression and will be utilized in the detailed description of Applicant's invention. The engine block 10 comprises the lower half and an upper engine head 12 is secured to block 10 with a gasket means 14 interposed therebetween. The block 10 and engine head 12 define a plurality of cylinders 16 within which a piston 18 reciprocates. In the engine head 12 there are formed a plurality of conduit means to deliver air and fuel to the cylinder and to exhaust spent gases. These would include at least one intake conduit and valve 20 for the introduction of air into the cylinder, and at least one exhaust conduit and valve 22 for the evacuation of spent gases from the cylinder. The fuel is introduced into the cylinder in a diesel engine typically by means of a fuel injection system 24.

The following figures are described with respect to a diesel engine, but have application to high compression gasoline or alternative fuel powered engines.

In FIG. 1, piston 18 is illustrated as being in the compression stroke in that it is reciprocating upwardly in cylinder 16 in block 10 in the direction of engine head 12. At or about top dead center, the compression of the fuel air mixture in the cylinder 16 will reach the ignition point and reverse the direction of piston 18 sending it back down the cylinder. This ignition takes place with circumferential sidewall 19 of piston 18 positioned below gasket means 14. This exposes the head gasket 14 to the heat of the ignition. The ignitions occur several hundred times per minute in each cylinder of a diesel engine, and therefore the head gasket can undergo deterioration quite rapidly, thereby effecting the efficiency of the engine and expensive down time and labor to disassemble the engine and replace the head gasket and reassemble the engine.

Figure 3:
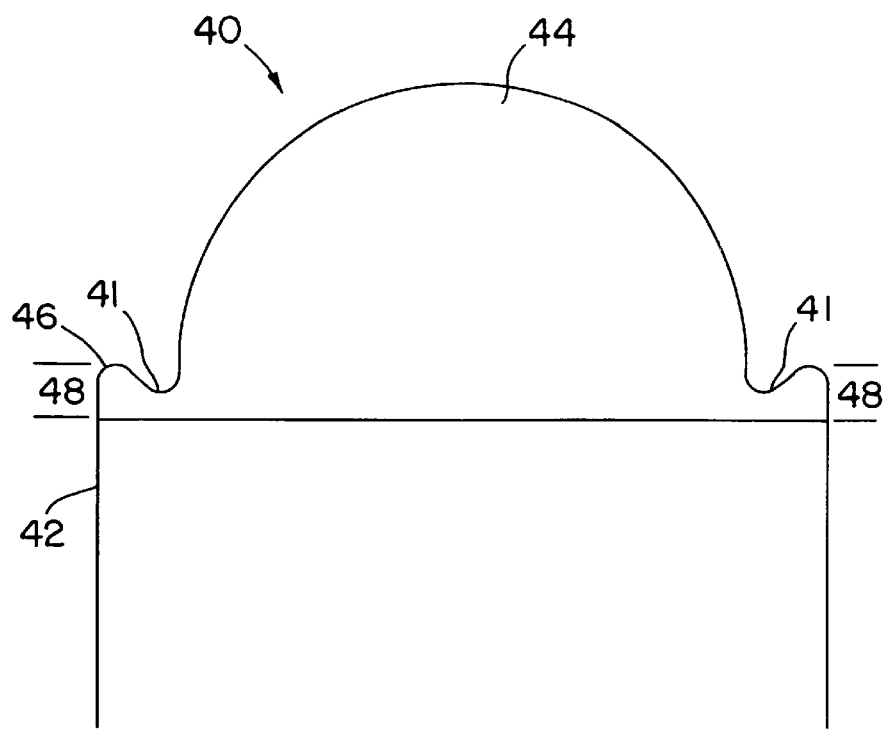
FIG. 3 is a cross sectional side view along plane 3—3 of FIG. 2 of the improved piston head of the present invention.
Figure 2:
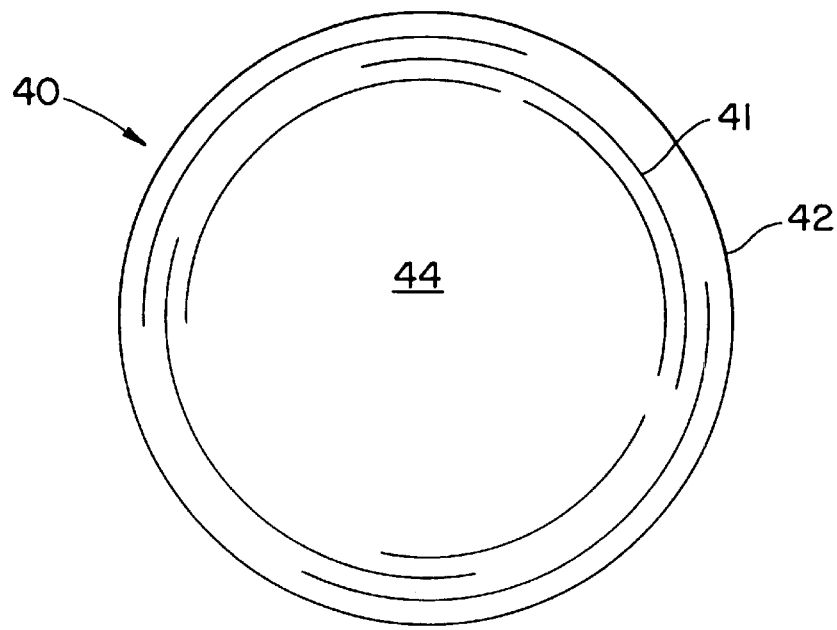
FIG. 2 is a top view of the improved piston head of the present invention.
Figure 4:
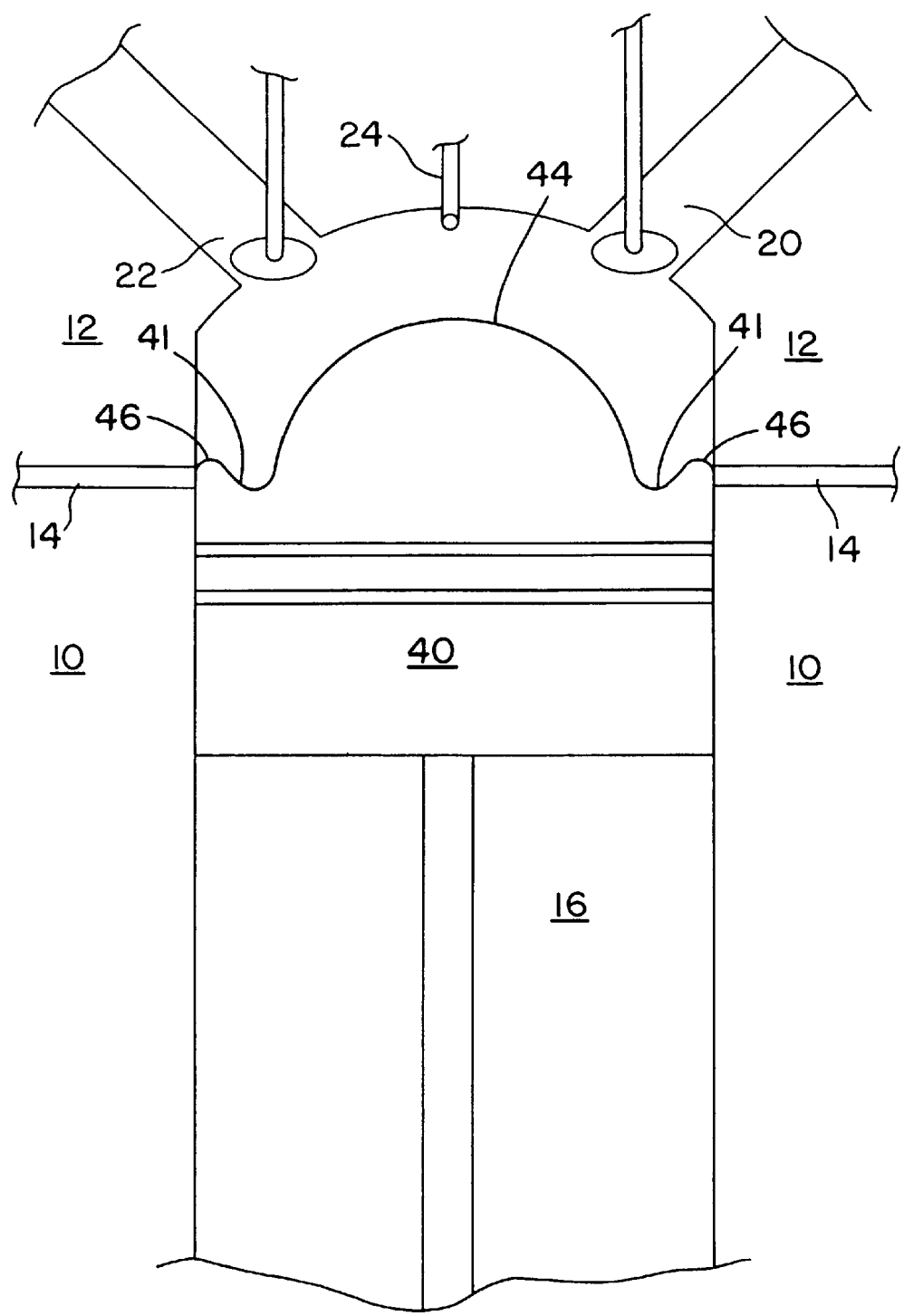
FIG. 4 is a cross sectional view as illustrated in FIG. 1, but with Applicant's piston head.

FIGS. 2 and 3 are illustrative of Applicant's improved piston head representing a top view and a side view of the improved piston head 40. Piston head 40 has a cylindrical side wall 42 and a spherical section upper wall 44 similar to that of the prior art. In improved piston head 40, the spherical section upper wall 44 does not merge with the cylindrical side wall 42 as in the prior art. Improved piston head 40's spherical section upper wall 44 flares outwardly and upwardly before merging with cylindrical side wall 42, forming an annular trough 41 and crest 46 about the periphery. In this manner the spherical section upper wall 44 is maintained for compression purposes within the combustion chamber, but the cylindrical side wall 42 achieves a measure of extra distance vertically such that when the improved piston 40 is in the compression mode for ignition at approximately top dead center, the additional cylindrical side wall vertical distance 48 is sufficient to mask and protect the gasket 14 during the ignition process. This can be illustrated with respect to FIG. 4 which is identical to FIG. 2 with the acception that the improved piston head 40 is now illustrated within the cylinder. In this manner it can be seen that when the piston 40 is at top dead center, the flare or crest portion 46 of the piston head or the additional cylindrical side wall vertical distance 48 is in the plane of the head gasket, and thus offers protection to the head gasket during the ignition phase. In the preferred embodiment, spherical section upper surface 44 is hemispherical.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A piston for an internal combustion engine, said piston comprising:

a body member defined by a cylindrical side wall, said body member having a lower end, said lower end having means for connection of said piston to a piston rod, said piston having an upper end defining a piston head, said piston head comprising an upstanding spherical section portion centrally positioned on said piston, said spherical section being hemispherical, said spherical section portion of said piston head having a diameter less than said piston, said spherical section portion flared outwardly and upwardly to the circumferential periphery of said piston head so as to form an annular U-shaped trough about said spherical section portion and an annular crest about said annular trough, said annular crest terminating at and defining said circumferential periphery of said piston head coincidental with cylindrical side wall of said piston.

2. An improved piston and cylinder assembly for an internal combustion engine, wherein said piston reciprocates within a cylinder and combustion chamber defined by an engine block and an engine head, said engine block and said engine head having a gasket positioned therebetween, the improvement being to said piston, said piston comprising:

a body member defined by a cylindrical side wall, said body member having a lower end, said lower end having means for connection of said piston to a piston rod, said piston having an upper end defining a piston head, said piston head comprising an upstanding spherical section portion centrally positioned on said piston, said spherical section being hemispherical, said spherical section portion of said piston head having a diameter less than said piston, said spherical section portion flared outwardly and upwardly to the circumferential periphery of said piston head so as to form an annular U-shaped trough about said spherical section portion and an annular crest about said annular trough, said annular crest terminating at and defining said circumferential periphery of said piston head coincidental with cylindrical side wall of said piston.

3. The improved piston and cylinder assembly in accordance with claim 2 wherein said cylindrical side wall proximate said annular crest of said piston head is positioned adjacent said gasket and in a plane of said gasket in said pistons uppermost reciprocating position.

* * * * *